UNITED STATES PATENT OFFICE.

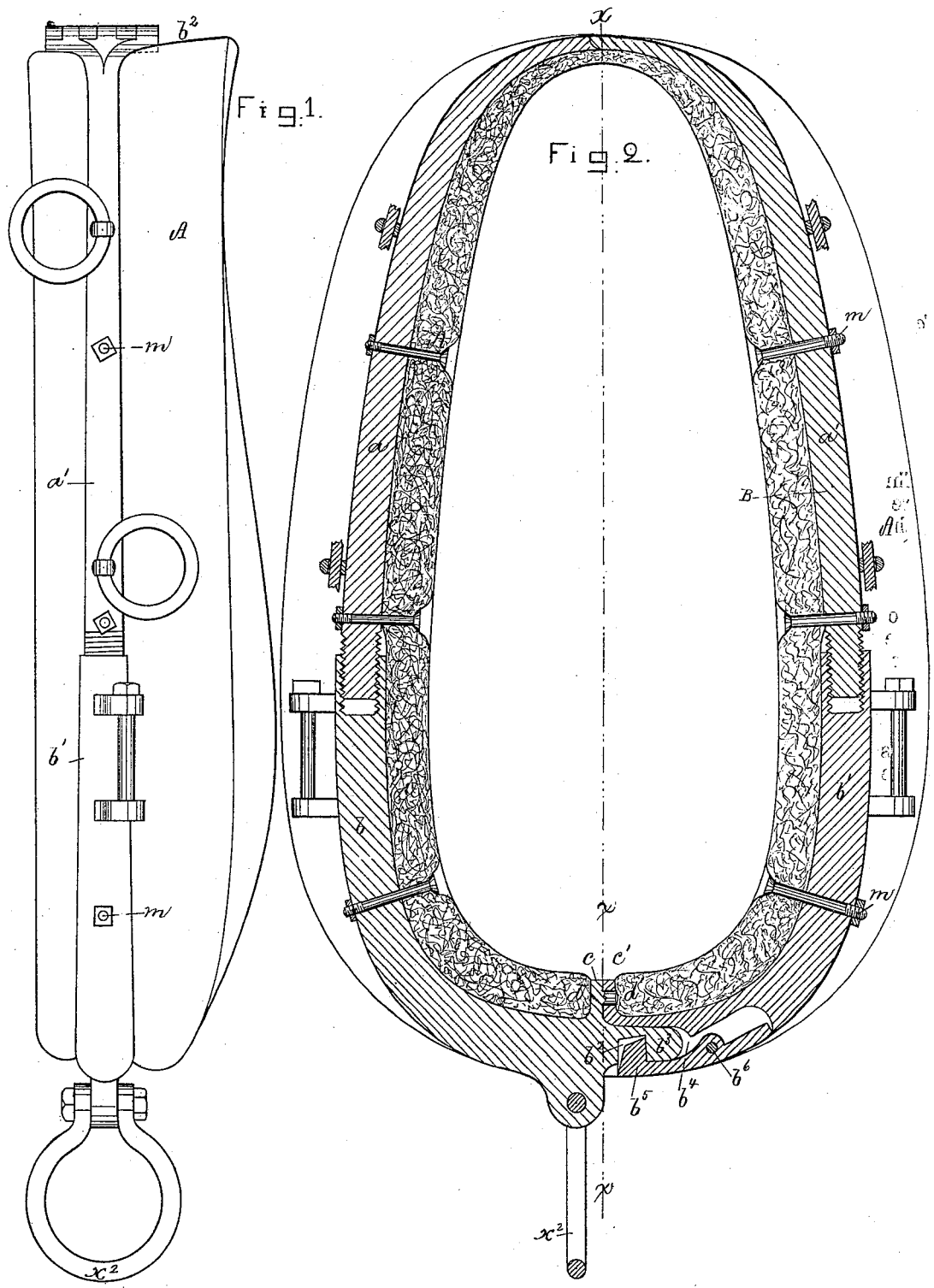

CHARLES E. BERRY, OF CAMBRIDGE, ASSIGNOR TO HIMSELF AND JOHN W. REGAN, OF BOSTON, MASSACHUSETTS.

HARNESS.

SPECIFICATION forming part of Letters Patent No. 234,519, dated November 16, 1880.

Application filed August 18, 1880. (No model.)

To all whom it may concern:

Be it known that I, CHARLES E. BERRY, of Cambridge, county of Middlesex, State of Massachusetts, have invented an Improvement in Harness, of which the following description, in connection with the accompanying drawings, is a specification.

This invention in fire-engine harness relates more especially to the hames and collars and to the harness-suspending apparatus.

Prior to this my invention it had been customary to suspend fire-engine harness upon several independent hooks attached to a rope run over pulleys, and the collars of harness so suspended have been separated or cut out at their lower ends, the hames at their lower ends being provided with a latch mechanism by which to fasten the hames together and about the neck of the horse when the hames are closed. In such apparatus now in use the lower ends of the collar do not meet when the hames are locked about the neck of the horse, and with such a hame and collar the horse's neck is apt to be caught and pinched badly as the hames are brought together to be locked, and as the collar ends do not meet, the latch mechanism has a chance to slip one part past the other. This open space at the lower end of the collar leaves corners, that as the collar is in use bear uncomfortably upon the neck of the horse near the breast, especially when the wheels of the engine strike a cross-walk or obstruction in the road, or when the engine is heavy and wheeling is bad.

In another form of collar the collar has been divided at its top by a hinge, and in closing the same about the neck of the horse one side or half of the collar has been moved longitudinally, or in the direction of the length of the collar, that being necessary to engage the socket-piece of one hame with a vertical pin of the other hame; but during this operation, which is performed with the greatest speed possible, the under side of the neck of the horse is liable to be caught and pinched as the two parts of the divided collar are being moved to engage the socket and pin.

In this my invention the lower ends of the collar are faced with metal, the said facing forming part of the lower parts of the hames, and the said ends abut closely together when the collar is closed, thus giving great stiffness to the collar and obviating the usual objectionable space at the lower end of the collar. The hames employed by me are hinged together above the collar, and consequently all liability of one part of the collar to move longitudinally with relation to the other part, or for the latch mechanism of the hames to pass by the other part when the hames are being closed, which would pinch the neck of the horse, is obviated.

The upper part of my improved collar is continuous, as indicated in Fig. 2, and being of leather is flexible, and being without joint at top, except at the junction of the two halves of the hames, a neck-pad is not needed, as when the top of the collar is divided and hinged.

In this my invention the collar and harness are suspended upon a three-armed jointed fork supported by a single cord, the arms of the said fork terminating in three hooks. The joint near the center of the fork is provided with a locking device to hold it in horizontal position and the harness elevated. When this locking device is released to permit the fork to turn on its joint the harness and collar are discharged.

Figure 1 represents, in side elevation, a collar and hames constructed in accordance with my invention; Fig. 2, a front view of the same, with the hames partly in section to show the method of changing the length of the hames so that the said hames may be applied to collars of various sizes.

The collar A is made of leather or other material, without joint at its top, and is separated or divided at its lower end on the line $x\ x$.

The hames B are composed of two rods or tubes, $a\ a'$, hinged together above, at $a^2$, at the top of the collar, and connected at their lower ends by screw-threads with parts $b\ b'$, one of said parts being provided with a notch, $b^2$, and a tongue, $b^3$, the latter being adapted to enter a recess, $b^4$, in the part $b'$ of the hames, a catch, $b^5$ on $b'$, operated by a suitable spring and pivoted at $b^6$, entering the said notch $b^2$ of the part $b$ when the hames and collar are brought together, as represented in Fig. 2. The lower ends of the parts $b\ b'$ are provided with metal faces or plates $c\ c'$, adapted to extend across and support the lower ends, $d'$, of the collar, the said plates acting as shoulders for the said ends of the collar and abutting together face to face when the collar is closed, as in Fig. 2, thus entirely obviating the formation of a space at the lower part of the collar.

By means of a screw-threaded connection (shown in Fig. 2) between the upper and lower members of the hames the latter may, when it is desired, be lengthened or shortened to adapt the hames to any ordinary collar, long or short, whereas in all other forms of fire-engine harness known to me the hames used will fit only one size of collar. Each half of the hames is bolted upon the collar, so as to insure the positive movements of the collar. The tongue and the recess are located in the arc of movement of the hames about the pivot hinging them together.

The lower part, $b$, of one-half the hames is provided with a loose ring, $x^2$, which is to be engaged by a snap on a strap connected with the end of the pole, the ring and snap obviating passing the usual pole-strap about the lower end of the closed collar.

I claim—

1. The hame parts, pivoted together at top by the single pivot $a^2$, and provided, one part with a recess, $b^4$, and face $c'$, and the other part with a tongue, $b^3$, to enter the said recess, a catch to engage the tongue, and a face, $c$, to abut against the face $c'$, the said two faces being between the ends of the collar, combined with the collar, separated only at its bottom, and to which collar the hame parts are secured, to operate as and for the purpose set forth.

2. The collar having a connected flexible top, combined with the hinged hames, having their lower ends provided with a recess and tongue, the said lower ends of the hames being made adjustable with relation to the upper hinged portions of the hames to adapt the hames to collars of different sizes or lengths, substantially as described.

3. The horse-collar, open only at its bottom, and the hames $a$ $a'$ $b$ $b'$, hinged together at the top of the collar, connected with the collar, and provided with a tongue and catch to hold the collar and hame parts together, combined with the loose ring $x$, connected with the lower end of one of the hame parts, as and for the purpose described.

In testimony whereof I have signed my name to this specification in the presence of two subscribing witnesses.

CHARLES E. BERRY.

Witnesses:
JOS. P. LIVERMORE,
JOSEPH P. CARTWRIGHT.